(12) United States Patent
Lofgren et al.

(10) Patent No.: US 7,780,560 B2
(45) Date of Patent: Aug. 24, 2010

(54) POWER TRANSMISSION BELT

(75) Inventors: Jeffrey Dwight Lofgren, Lincoln, NE (US); Larry Dean Goettsch, Lincoln, NE (US)

(73) Assignee: Veyance Technologies, Inc., Fairlawn, OH (US)

( * ) Notice: Subject to any disclaimer, the term of this patent is extended or adjusted under 35 U.S.C. 154(b) by 602 days.

(21) Appl. No.: 11/588,597

(22) Filed: Oct. 27, 2006

(65) Prior Publication Data
US 2008/0103001 A1    May 1, 2008

(51) Int. Cl.
F16G 1/00 (2006.01)
F16G 5/00 (2006.01)

(52) U.S. Cl. .................. 474/237; 474/250; 474/260; 474/263; 474/268; 57/237; 57/241; 156/139; 428/364; 428/403

(58) Field of Classification Search .............. 474/237, 474/263; 428/221
See application file for complete search history.

(56) References Cited

U.S. PATENT DOCUMENTS

| 3,469,001 | A |  | 9/1969 | Keefe | 264/290.5 |
|---|---|---|---|---|---|
| 4,652,252 | A | * | 3/1987 | Westhoff et al. | 474/204 |
| 5,211,609 | A |  | 5/1993 | Haines | 474/260 |
| 5,802,839 | A | * | 9/1998 | Van Hook | 57/236 |
| 6,132,328 | A | * | 10/2000 | Kinoshita et al. | 474/260 |
| 6,558,282 | B2 |  | 5/2003 | Danhauer et al. | 474/266 |
| 6,908,676 | B2 |  | 6/2005 | Sogabe et al. | 428/403 |
| 2002/0142147 | A1 |  | 10/2002 | Sogabe et al. | 428/295.1 |
| 2006/0213174 | A1 | * | 9/2006 | Wu | 57/237 |

FOREIGN PATENT DOCUMENTS

| JP | 11336847 | 9/1989 |
|---|---|---|
| WO | WO 03/023254 | 3/2003 |
| WO | WO 2006/102641 A | 9/2006 |

* cited by examiner

*Primary Examiner*—Robert A Siconolfi
*Assistant Examiner*—San Aung
(74) *Attorney, Agent, or Firm*—Alvin T. Rockhill; Kathleen Bowen

(57) ABSTRACT

A power transmission belt has a compression section, a tension section, and a load carrying section. The load carrying section has a plurality of reinforcing cords. The reinforcing cords are formed from poly(p-phenylene-2,6-benzobisoxazole) (PBO). In each reinforcing cord, the cords have a yarn twist greater than the cord twist, and the cord twist is in the range of one-forth to one-half of a ply twist.

15 Claims, 2 Drawing Sheets

POWER TRANSMISSION BELT

FIELD OF THE INVENTION

The present invention is related to a power transmission belt. More specifically, the present invention is directed to a power transmission belt wherein the belt is reinforced with PBO fibers.

BACKGROUND OF THE INVENTION

In conventional power transmission belts, the belt has an inner compression section, an outer tension section, and an intermediate neutral plane. Typically, helically wound reinforcing cords are located within the neutral plane and so the neutral plane is also referred to as the load carrying zone. Such belts also having a variety of groove and rib configurations, using longitudinal or transverse grooves or a combination of both. The grooves are located in the inner compression section of the belt. The grooves assist in engaging a pulley in the power transmission system. For some belts, grooves and rib configurations may also be provided in the outer tension section.

The reinforcing cords in the load carrying zone provide a majority of the tensile strength to the belt. Thus, the materials forming the belt are important. It is known to use high modulus material for the reinforcing cords, including the use of poly(p-phenylene-2,6-benzobisoxazole). However, due to the distinct physical properties of the PBO yarns, simple substitution of PBO yarns for known polyester or aramid cords in power transmission belts may not yield a belt having acceptable performance properties.

SUMMARY OF THE INVENTION

The present invention is directed to a power transmission belt, including but not limited to synchronous drive belts or various types of poly-v belts. The belt has a compression section, a tension section, and a load carrying section. The load carrying section is defined by a plurality of reinforcing cords. The reinforcing cords are formed from poly(p-phenylene-2,6-benzobisoxazole) (PBO). In each reinforcing cord, the cords have a yarn twist greater than the cord twist, and the cord twist is in the range of one-forth to one-half of a ply twist.

In other aspects of the invention, the twist multiplier of the yarn of the reinforcing cords is in the range of 1.0 to 1.5, the twist multiplier of the ply of the reinforcing cords is in the range of 3.2 to 4.3, and the twist multiplier of the cord of reinforcing cords is in the range of 1.7 to 4.1.

In another aspect of the invention, the PBO reinforcing yarns have a denier in the range of 1090 dTex to 3270 dTex.

In another aspect of the invention, the belt has a longitudinal direction and the reinforcing cords are inclined at an angle of 0° to 30° relative to the longitudinal direction of the belt.

In another aspect of the invention, the PBO cords have a construction selected from the group consisting of 1×2, 1×2× 3, 1×4×3 or 1×4×5.

BRIEF DESCRIPTION OF THE DRAWING

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principles of the invention and should not be taken in a limiting sense. The scope of the invention is best determined by reference to the appended claims.

Figure 1:
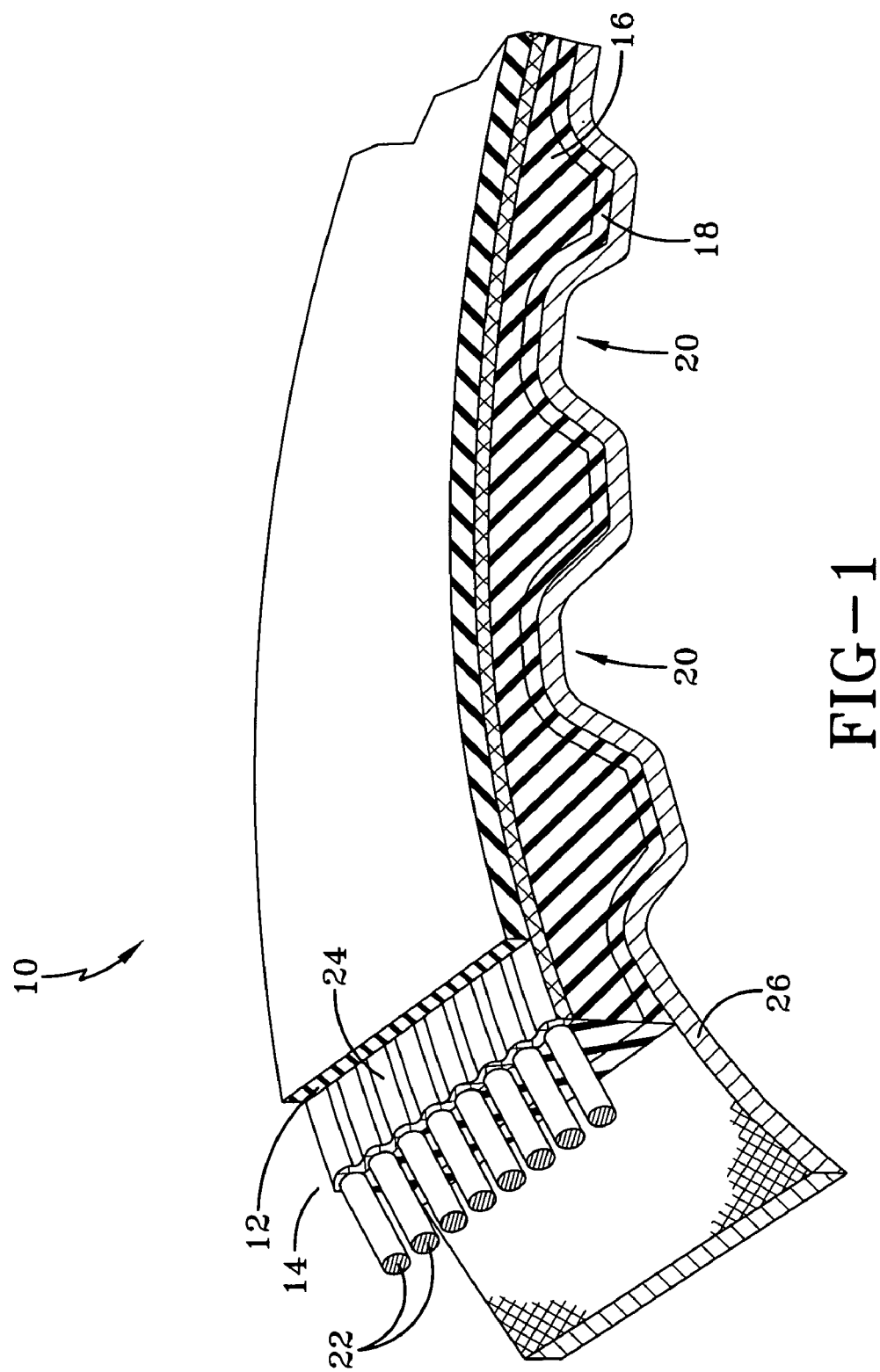
FIG. 1 illustrates a timing belt and FIG. 2 illustrates an alternative belt.

The timing belt shown generally at 10 in FIG. 1, has a tension section 12, a load carrying section 14, and a compression section 16. The compression section has a plurality of transverse ribs 18 with a plurality of transverse grooves 20. The load carrying section 14 has longitudinal reinforcing cords 22 embedded in a suitable material 24.

The tension section 12 of the belt is formed from elastomeric materials. The elastomers may be any one of those known to be suitable for use in such belts, e.g., polychloroprene, polyurethane, NBR, IIR, IR, SBR, CSM, EPDM, other thermosets, thermoplastic elastomers and other polymer alloys.

The compression section 16 is formed of elastomeric material. The elastomeric material may be any suitable material known in the art. The elastomeric material forming the compression section 16 may be the same or similar to that forming the tension section 12. Alternatively, the elastomer of the compression section 16 may be of different base compounds from the elastomer in the tension section 12. The elastomeric material may also be reinforced with discrete fibers. Preferably the fibers are laterally extending and have portions projecting from the side surfaces of the longitudinal ribs 18. Depending upon the end use of the belt, a continuous reinforcing layer of cords or fabric may be located at the surface of the compression section 16. The outermost surface of the compression section 16, forming the innermost surface of the belt 10, may be provided with a fabric layer 26 to alter the surface properties of the belt 10.

In accordance with the present invention, the reinforcing cords 22 in the load carrying section 14 are multifilament poly(p-phenylene-2,6-benzobisoxazole) ("PBO") yarns or cords. Presently there are two types of PBO fiber, AS (as spun) and HM (high modulus). The PBO-AS yarns have a denier in the range of 278 dTex to 1670 dTex, while the PBO-HM yarns have a denier in the range of 273 dTex to 3270 dtex. For the present invention, PBO-HM yarn preferred with a denier in the range of 1090 to 3270 dTex. The PBO yarns are twisted into cords; suitable cord constructions include 1×2, 1×2×3, 1×4×3 and 1×4×5.

To achieve the desired flex fatigue while maintaining a high modulus for the PBO cords, the individual PBO yarns have a twist multiplier in the range of 1.0-1.5, the plies created by multiple yarns have a twist multiplier in the range of 3.2-4.3, and the cord has a final twist multiplier of 1.7 to 4.1. The twist multiplier for any of the elements is calculated by the universal equation of twist multiplier wherein the twist multiplier is equal to the value of turns per meter times the square root of the denier as measured in dTex, said value then divided by 3000 (i.e. twist multiplier=[turns per meter×square root of dTex]/3000). With these desired twist multiplier ranges, the ply twist is always greater than the yarn twist, and the cord twist is less than with the yarn or the ply twist. Preferably, the cord twist is in the range of one-fourth to one-half the ply twist. PBO cords with these twist multiplier values result in a belt having a good flex fatigue while maintaining a high modulus. Higher twist values may provide a slightly better flex fatigue to the belt but would reduce the belt modulus. Conversely, lower twist values would increase the belt modulus, but reduce flex fatigue—a critical feature for a power transmission belt. The yarns and plies are twisted in the same direction, while the cord has an opposing twist direction; the cord twists are thus either ZZS or SSZ.

Due to the strength provided by the PBO cords, the width of the transmission belt can be reduced over conventional belts. This reduces the cost of the power transmission system over the life of the system and the belts.

Within the belt 10, the reinforcing cords 22 are inclined at an angle of 0° to 30° relative to the longitudinal direction of the belt. The inclination angle of the cords 22 in the belt affects the elongation properties of the belt. Due to the high tensile strength of the reinforcing cords 22, the lower the inclination angle of the cords 22 within the belt, the lower the elongation of the belt while a greater cord inclination angle yields a more elastic belt.

The PBO yarns may be coated with a suitable adhesive, including the dual adhesive coating of a first coat of an epoxy-latex mixture and a second adhesive coat of resorcinol-formaldehyde latex (RFL). Such a dual dipped yarn is more disclosed in U.S. Pat. No. 6,824,871; said patent is fully incorporated herein by reference thereto.

Figure 2:
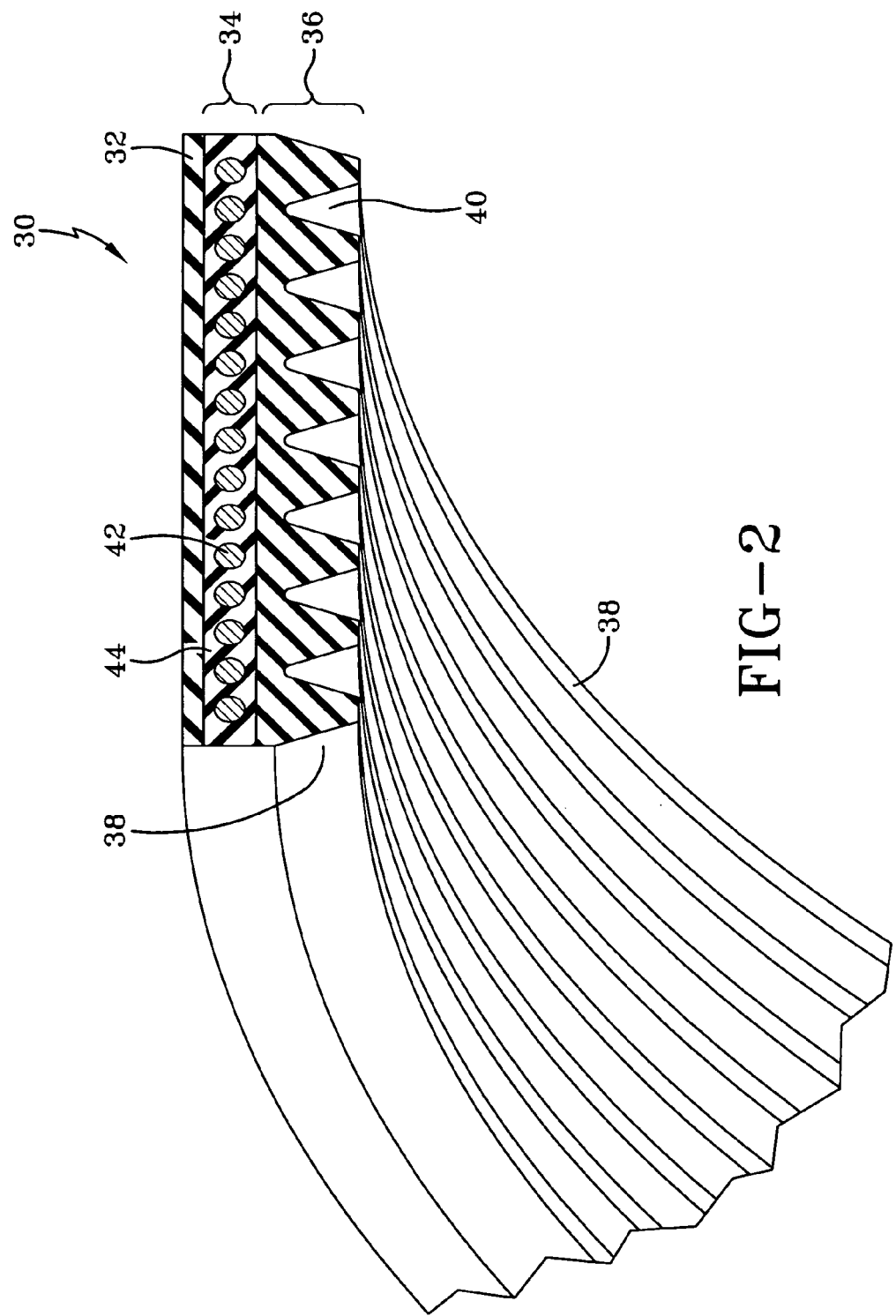

FIG. 2 illustrates a poly-v belt 30. The belt 30 has a tension section 32, a load carrying section 34, and a compression section 36. The compression section 36 has a plurality of longitudinal ribs 38 with a plurality of transverse grooves 40. The load carrying section 34 has longitudinal reinforcing cords 42 embedded in a suitable material 44. Similar to the belt 10 of FIG. 1, the reinforcing cords 42 may be formed from PBO yarns and cords of the type discussed above.

What is claimed is:

1. A belt having a compression section, a tension section, and a load carrying section, the load carrying section comprising longitudinal reinforcing cords of poly(p-phenylene-2,6-benzobisoxazole), the belt being characterized by:
    the reinforcing cords having a yarn twist greater than a cord twist, and the cord twist being in the range of one-forth to one-half of a ply twist of the reinforcing cords, wherein the twist multiplier of the yarn of the reinforcing cords is in the range of 1.0 to 1.5, wherein the twist multiplier of the ply of the reinforcing cords is in the range of 3.2 to 4.3, wherein the twist multiplier of the cord of reinforcing cords is in the range of 1.7 to 4.1, wherein the yarns and plies are twisted in the same direction with the cord being twisted in the opposite twist direction.

2. The belt of claim 1 wherein the reinforcing yarns have a denier in the range of 1090 dTex to 3270 dTex.

3. The belt of claim 1 wherein the belt has a longitudinal direction and the reinforcing cords are inclined at an angle of 0° to 30° relative to the longitudinal direction of the belt.

4. The belt of claim 1 wherein the reinforcing cords have a 1×4×5 construction.

5. The belt of claim 1 wherein the reinforcing cords have a 1×4×3 construction.

6. A belt having a compression section, a tension section, and a load carrying section, the load carrying section comprising longitudinal reinforcing cords of poly(p-phenylene-2,6-benzobisoxazole), the belt being characterized by:
    the reinforcing cords having a yarn twist greater than a cord twist, and the cord twist being in the range of one-forth to one-half of a ply twist of the reinforcing cords, wherein the yarns and plies are twisted in the same direction with the cord being twisted in the opposite twist direction, and wherein the reinforcing cords have a 1×4×3 construction.

7. The belt of claim 6 wherein the twist multiplier of the yarn of the reinforcing cords is in the range of 1.0 to 1.5, and wherein the twist multiplier of the cord of reinforcing cords is in the range of 1.7 to 4.1.

8. The belt of claim 7 wherein the reinforcing yarns have a denier in the range of 1090 dTex to 3270 dTex.

9. The belt of claim 8 wherein the belt has a longitudinal direction and the reinforcing cords are inclined at an angle of 0° to 30° relative to the longitudinal direction of the belt.

10. The belt of claim 9 wherein the twist multiplier of the ply of the reinforcing cords is in the range of 3.2 to 4.3.

11. A belt having a compression section, a tension section, and a load carrying section, the load carrying section comprising longitudinal reinforcing cords of poly(p-phenylene-2,6-benzobisoxazole), the belt being characterized by:
    the reinforcing cords having a yarn twist greater than a cord twist, and the cord twist being in the range of one-forth to one-half of a ply twist of the reinforcing cords, wherein the yarns and plies are twisted in the same direction with the cord being twisted in the opposite twist direction, and wherein the reinforcing cords have a 1×4×5 construction.

12. The belt of claim 11 wherein the twist multiplier of the yarn of the reinforcing cords is in the range of 1.0 to 1.5, and wherein the twist multiplier of the cord of reinforcing cords is in the range of 1.7 to 4.1.

13. The belt of claim 12 wherein the reinforcing yarns have a denier in the range of 1090 dTex to 3270 dTex.

14. The belt of claim 13 wherein the belt has a longitudinal direction and the reinforcing cords are inclined at an angle of 0° to 30° relative to the longitudinal direction of the belt.

15. The belt of claim 14 wherein the twist multiplier of the ply of the reinforcing cords is in the range of 3.2 to 4.3.

\* \* \* \* \*